(12) United States Patent
Trainin

(10) Patent No.: US 7,263,105 B2
(45) Date of Patent: Aug. 28, 2007

(54) WLAN DEVICE AND METHOD FOR INTERFACING BETWEEN A MAC SUBLAYER AND A PHYSICAL LAYER

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 10/322,880

(22) Filed: Dec. 18, 2002

(65) Prior Publication Data

US 2004/0120292 A1 Jun. 24, 2004

(51) Int. Cl.
*H04L 12/413* (2006.01)

(52) U.S. Cl. .................................. 370/445; 370/389

(58) Field of Classification Search ............ 370/389, 370/445
See application file for complete search history.

(56) References Cited

U.S. PATENT DOCUMENTS

| | | | |
|---|---|---|---|
| 5,844,905 A | 12/1998 | McKay et al. ............ 370/443 |
| 6,198,728 B1 | 3/2001 | Hulyalkar et al. ........... 370/252 |
| 7,058,064 B2 * | 6/2006 | Nemirovsky et al. ..... 370/395.7 |
| 7,065,036 B1 * | 6/2006 | Ryan ........................ 370/208 |
| 2003/0058870 A1 * | 3/2003 | Mizrachi et al. ........ 370/395.52 |
| 2003/0174665 A1 * | 9/2003 | Benveniste ................ 370/317 |

* cited by examiner

*Primary Examiner*—Hassan Kizou
*Assistant Examiner*—Jay P. Patel
(74) *Attorney, Agent, or Firm*—Schwegman, Lundberg, Woessner & Kluth, P.A.

(57) ABSTRACT

A wireless local area network (WLAN) device (200, FIG. 2) includes a medium access control (MAC) device (204) and a physical (PHY) device (202). The PHY device receives and transmits frames (FIG. 3) over a wireless medium. The MAC device detects (604, FIG. 6) when receipt is completed of a physical layer convergence procedure (PLCP) header (304, FIG. 3) of a received frame. Based on information that the MAC device extracts (606) from the PLCP header, the MAC device predicts (618) header information for a response frame before receipt of the received frame has completed. The PHY device begins transmitting (1110, FIG. 11) the response frame preamble (302, FIG. 3) upon expiration of an interframe space (IFS).

27 Claims, 9 Drawing Sheets

WLAN DEVICE AND METHOD FOR INTERFACING BETWEEN A MAC SUBLAYER AND A PHYSICAL LAYER

FIELD OF THE INVENTION

The present invention pertains to wireless local area networks (WLANs) and, more particularly, to an interface between a medium access control (MAC) sublayer and a physical (PHY) layer.

BACKGROUND OF THE INVENTION

Any Wireless Local Area Network (WLAN) device that supports an IEEE 802.11 Standard (e.g., IEEE Std 802.11-1997, 802.11a, 802.11b, etc.) includes two main parts: a physical (PHY) layer signaling control device, and a medium access control (MAC) device. The function of the PHY device is to transfer bits over the air interface. Among other things, the function of the MAC device is to fairly control access to the shared air interface.

The minimal MAC protocol consists of two frames: a frame sent from a source to a destination; and an acknowledgment (ACK) from the destination that the frame was received correctly. If the MAC protocol implemented in the destination does not transmit an ACK shortly after receiving a frame, another network station may start transmitting over the air interface and the frame's source may not receive the ACK in time. If the source does not receive the ACK in time, the source attempts to retransmit the frame. In some cases, retransmissions may be frequent, which increases bandwidth consumption. In addition, if a source's retry counter reaches its limit, then the frame is discarded.

Due to delays in coding and modulation schemes used for wireless media, the amount of time that remains after receiving a message is sometimes insufficient. Accordingly, what is needed is a method for a MAC device to perform its various processes in a manner that increases the likelihood that a response (e.g., an ACK) will be sent as quickly as possible after a time period, referred to as an interframe space, expires after receiving a frame.

BRIEF DESCRIPTION OF THE DRAWINGS

The appended claims point out different embodiments of the invention with particularity. However, the detailed description presents a more complete understanding of the present invention when considered in connection with the figures, wherein like-reference numbers refer to similar items throughout the figures and:

DETAILED DESCRIPTION

Figure 1:
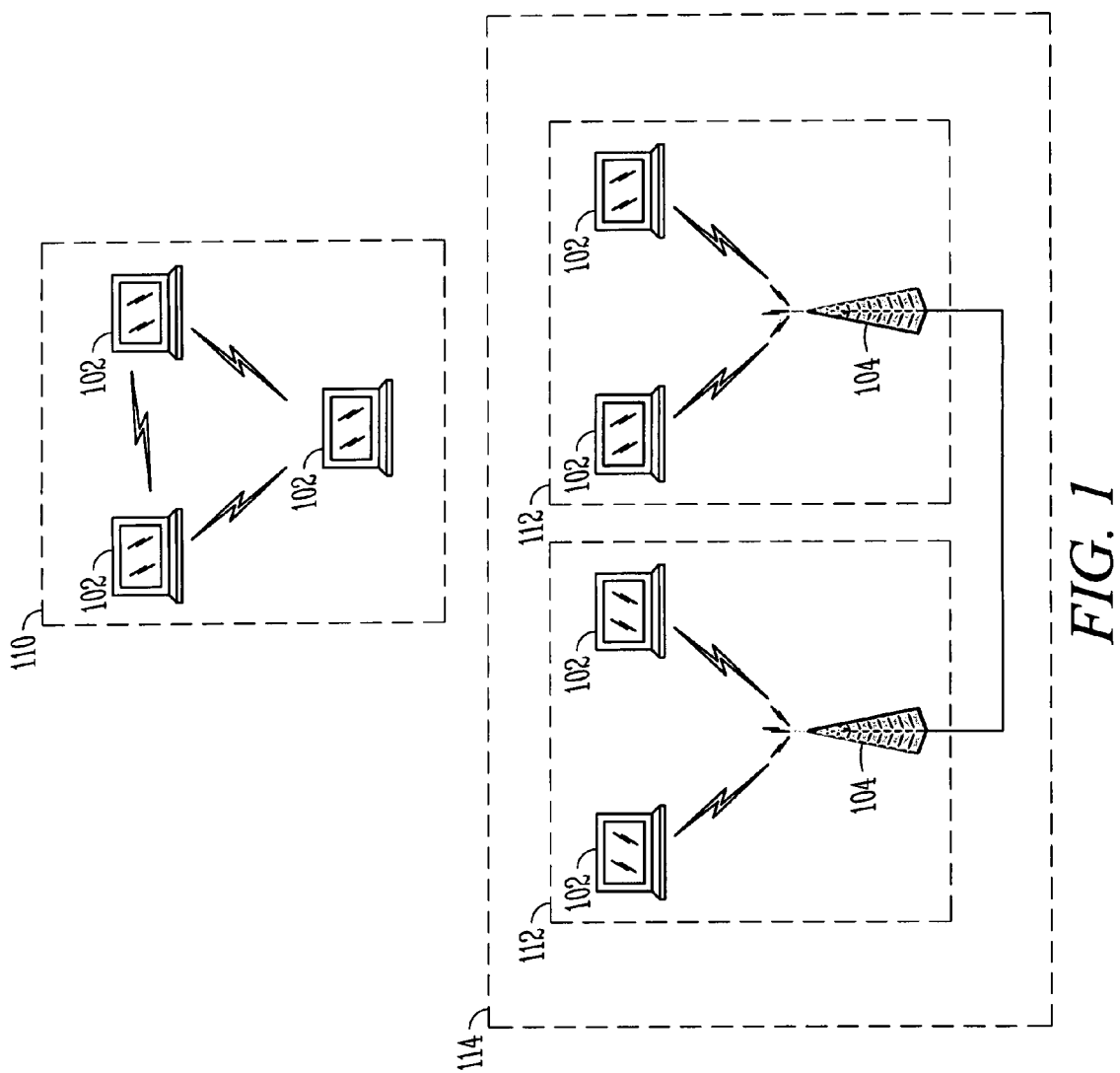
FIG. 1 is a simplified diagram of example WLANs in accordance with an embodiment of the present invention.

FIG. 1 is a simplified diagram of example wireless local area networks (WLANs) in accordance with an embodiment of the present invention. A WLAN may include multiple network stations 102 and one or more access points (APs) 104.

In a WLAN, network stations 102 communicate over the medium of free space, commonly referred to as the "air interface." Generally, a station 102 may be referred to as a network adapter or network interface card (NIC). A station 102 may be mobile, portable or stationary. For example, a station 102 may be a laptop computer, a handheld radio, a desktop computer, or virtually any other one-way or two-way device with the capability of communicating with other devices 102 or APs 104 over a wireless medium.

A set of stations 102 may communicate directly with each other, as is the case in a Basic Service Set (BSS). An Independent BSS (IBSS) 110 is a BSS in which there is no connection to a wired network.

An infrastructure BSS 112 is a BSS in which a BSS includes an AP 104. In an infrastructure BSS, all stations 102 communicate with an AP 104. The AP 104 provides the connection to the wired LAN, if any, and the local relay function for the BSS. Accordingly, if a first station 102 wants to communicate with a second station 102, the first station 102 sends the communication to the AP 104, and the AP 104 relays the communication to the second station 102.

An Extended Service Set (ESS) 114 is a set of infrastructure BSSs 112, where the APs 104 communicate among themselves to forward traffic from one BSS 112 to another, and to facilitate the movement of stations 102 from one BSS to another. The Distrubution System (DS) is the mechanism by which one AP 104 communicates with another to exchange frames from stations 102 in their BSSs 112, forward frames to follow mobile stations 102 from one BSS 112 to another, and exchange frames with wired networks, if any.

Figure 2:
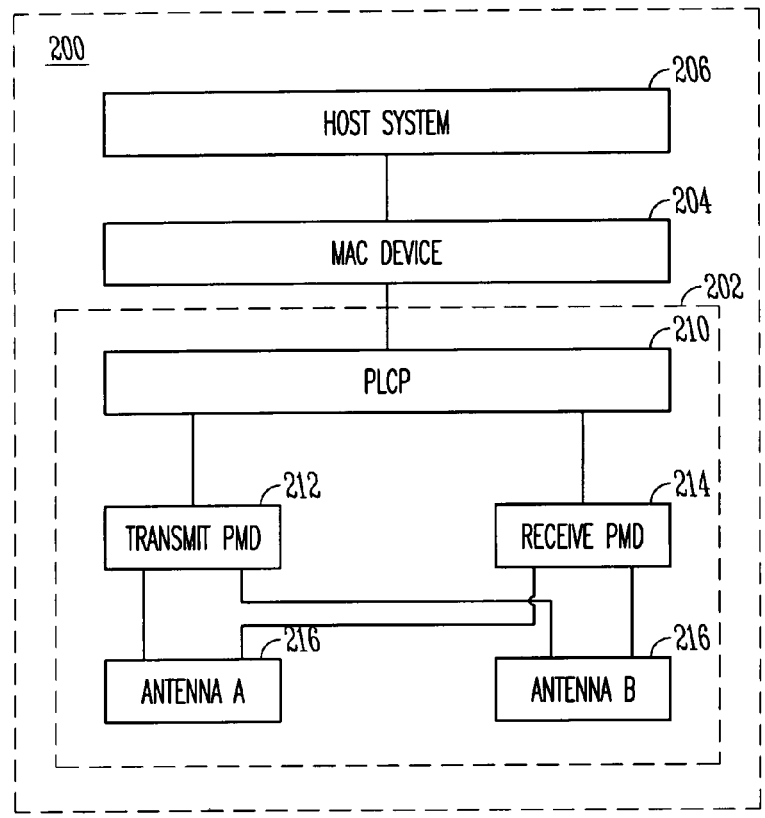
FIG. 2 is a simplified block diagram of a WLAN station in accordance with an embodiment of the present invention.

FIG. 2 is a simplified block diagram of a WLAN station 200 (e.g., stations 102, 104, FIG. 1) in accordance with an embodiment of the present invention. A WLAN station 200 supports station services. These services may include authentication, deauthentication, privacy, and delivery of data.

Any WLAN station 200 that supports an IEEE 802.11 Standard (e.g., IEEE Std 802.11-1997, 802.11a, 802.11b, etc.) includes a physical (PHY) layer signaling control device 202 (PHY device), a medium access control (MAC) device 204, an a host system 206. The host system 206 creates and processes data, among other things. The purpose of the PHY and MAC devices 202, 204 is to ensure that two network stations are communicating with the correct frame format and protocol. An IEEE Std 802.11 defines the communication protocol between the PHY and MAC devices 202, 204.

The function of the PHY device 202 is threefold: 1) to provide a frame exchange between the MAC 204 and PHY 202 under the control of a physical layer convergence procedure (PLCP) sublayer; 2) to transmit data frames over the air interface under the control of the physical medium dependent (PMD) sublayer; and 3) to provide a carrier sense indication back to the MAC 204 so the MAC 204 is able to verify activity on the air interface.

The PHY device 202 implements one of several physical layer specifications, such as infrared (IR) baseband, frequency hopping spread spectrum (FHSS), direct sequence spread spectrum (DSSS), or orthogonal frequency domain multiplexing (OFDM). Other specifications could be implemented in other embodiments.

In general, the PHY device 202 includes PLCP apparatus 210, and transmit and receive PMD apparatuses 212, 214. Each of these may or may not use some or all of the same physical circuitry (e.g., processors, busses, clocks, storage, etc.). In addition, one or more antennae 216 may be interconnected with PMD apparatus 212, 214. When an IR baseband specification is implemented, an LED (not shown) or other optical transmission device may be used instead of the antennae 216.

As mentioned above, a function of PLCP apparatus 210 is to control the frame exchange between the MAC device 204 and the PHY device 202. The function of PMD apparatuses 212, 214 is to control signal carrier and spread spectrum modulation and demodulation for transmitting and receiving data frames over the air interface.

The structures of PMD apparatuses 212, 214 depend on the particular physical layer specification (e.g., the modulation type) implemented in the station. For example, if DSSS is used, the transmit PMD apparatus 212 may include a scrambler, an adder, a mask filter, and a DBPSK DQPSK modulator, and the receive PMD apparatus 214 may include a de-spread correlator, a DBPSK DQPSK de-modulator, a de-scrambler, and a timing clock recovery device. If FHSS is used, the transmit PMD apparatus 212 may include a data whitener, a symbol mapper, a Gaussian shaping filter, and a modulator, and the receive PMD apparatus 214 may include a de-modulator, a data de-whitener, and a hop timing recovery device. If IR is used, the transmit PMD apparatus 212 may include a symbol mapper, a modulator, and an LED driver, and the receive PMD apparatus 214 may include a diode detector, a de-modulator, and a symbol mapper. If OFDM is used, the transmit PMD apparatus 212 may include a convolutional encoder, a bit interleaving and mapping device, an inverse FFT, a symbol shaper, and a QAM modulator, and the receive PMD apparatus 214 may include a PSK QAM de-modulator, an FFT, a bit de-interleaving and de-mapping device, a convolutional decoder, and a clock recovery device.

Among other things, the function of the MAC device 204 is to fairly control access to the shared air interface. The MAC device 204 provides an interface between the host system 206 and the PHY device 202. In addition, the MAC device 204 may or may not perform encryption and decryption. The MAC device supports the MAC sublayer according to an IEEE Std 802.11.

Because the air interface is often very noisy and unreliable, an IEEE Std 802.11 MAC device 204 implements a frame exchange protocol to allow the source of a data frame to determine whether the frame has been successfully received at the destination. The minimal MAC protocol consists of two frame: 1) a sent frame that includes a frame sent from the source to the destination; and 2) a response frame that includes an acknowledgment (ACK) from the destination that the sent frame was received correctly. In addition, a sent frame might be one of the following: an acknowledgement (ACK), a request to send (RTS), a clear to send (CTS), or a PC-Poll. The corresponding response frames would be, respectively: a fragment; a CTS; a data frame; and an ACK.

Figure 3:
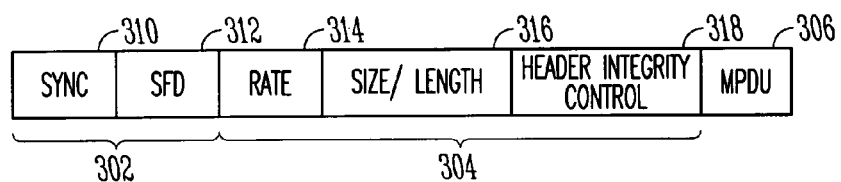
FIG. 3 illustrates an IEEE Std 802.11 frame format for a PPDU frame.

FIG. 3 illustrates an IEEE Std 802.11 frame format for a PLCP protocol data unit (PPDU) frame. A PPDU frame represents the format of a frame as it is transmitted over the air interface. A PPDU frame includes a PLCP preamble 302, a PLCP header 304, and a MAC protocol data unit (MPDU) 306.

A receiver uses the PLCP preamble 302 to acquire an incoming signal and synchronize the demodulator. SYNC field 310 contains a string of 128 bits. The receiver uses this field 310 to acquire the incoming signal and synchronize the receiver's carrier tracking and timing prior to receiving the start of frame delimiter (SFD) 312. The SFD field 312 contains information marking the start of a PPDU frame.

Within the PLCP header 304 are a rate field 314, length/size field 316, and PLCP Header Integrity Control field 318. The rate field 314 indicates which type of modulation must be used to receive the incoming MPDU 306. The binary value in this field equals the data rate multiplied by 100 kbit/sec. Rates may include 1 Mbps DBPSK, 2 Mbps DQPSK, or other rates, for example. The length/size field 316 indicates the length of the MPDU 306. In various embodiments, field 316 could include a number of microseconds necessary to transmit the MPDU 306, a number of bytes in the MPDU 306, or some other value indicating the length of the MPDU 306. As is described in more detail later, the MAC 204 uses the information in this field to determine the end of a PPDU frame. The PLCP Header Integrity Control field 318 is used to check the integrity of the PLCP header 304, as is described in more detail later in conjunction with FIG. 6.

The MPDU 306 can be of a variable length. The format of the MPDU 306 is discussed in detail in conjunction with FIG. 4. The MPDU 306 is a series of fields that is assembled by the MAC 204 and passed to the PHY 202 via PLCP 210.

Figure 4:
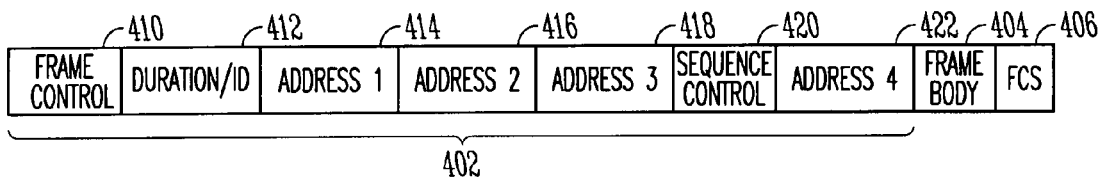
FIG. 4 illustrates an IEEE Std 802.11 frame format for a MPDU frame.

FIG. 4 illustrates an IEEE Std 802.11 frame format for an MPDU frame. An MPDU frame includes a MAC header 402, a frame body field 404, and a frame check sequence (FCS) field 406. The MAC header 402 may include a frame control field 410, a duration/ID field 412, four address fields 414, 416, 418, 422, and a sequence control field 420, although not all of these fields are used in all frames. The frame body field 404 is of a variable length, and its contents may or may not be encrypted. This field 404 contains the MAC service data unit (MSDU) from higher layer protocols. The FCS field 406 contains the result of applying the CCITT CRC-32 polynomial to the MAC header 402 and the frame body field 404.

An IEEE Std 802.11 implements a "listen before talk" access mechanism. In other words, a network station listens to the air interface before starting a transmission. Specifically, a wireless device may send a frame only when received data has not been present on the air interface for a particular time interval, referred to as the Interframe Space (IFS). However, an ACK should be sent without listening after a time interval, referred to as a Short IFS (SIFS). In some cases, a device may be required to wait longer time periods, such as a Priority IFS (PIFS), which is the SIFS plus one slot time, a Distributed IFS (DIFS), which is the SIFS plus two slot times, and an Extended IFS (EIFS), which is much larger than any of the other intervals. Other waiting periods also could be implemented. Although the below description refers to waiting the SIFS before transmitting a response, it would be apparent to one of skill in the art based on the description herein, that the various embodiments could be modified to apply to waiting other time periods (e.g., PIFS, DIFS, EIFS, or other) before transmitting a response. The term "Interframe Space" or "IFS" is intended to encompass all of the above time intervals and any other specified time interval that is not specifically listed above.

Figure 5:
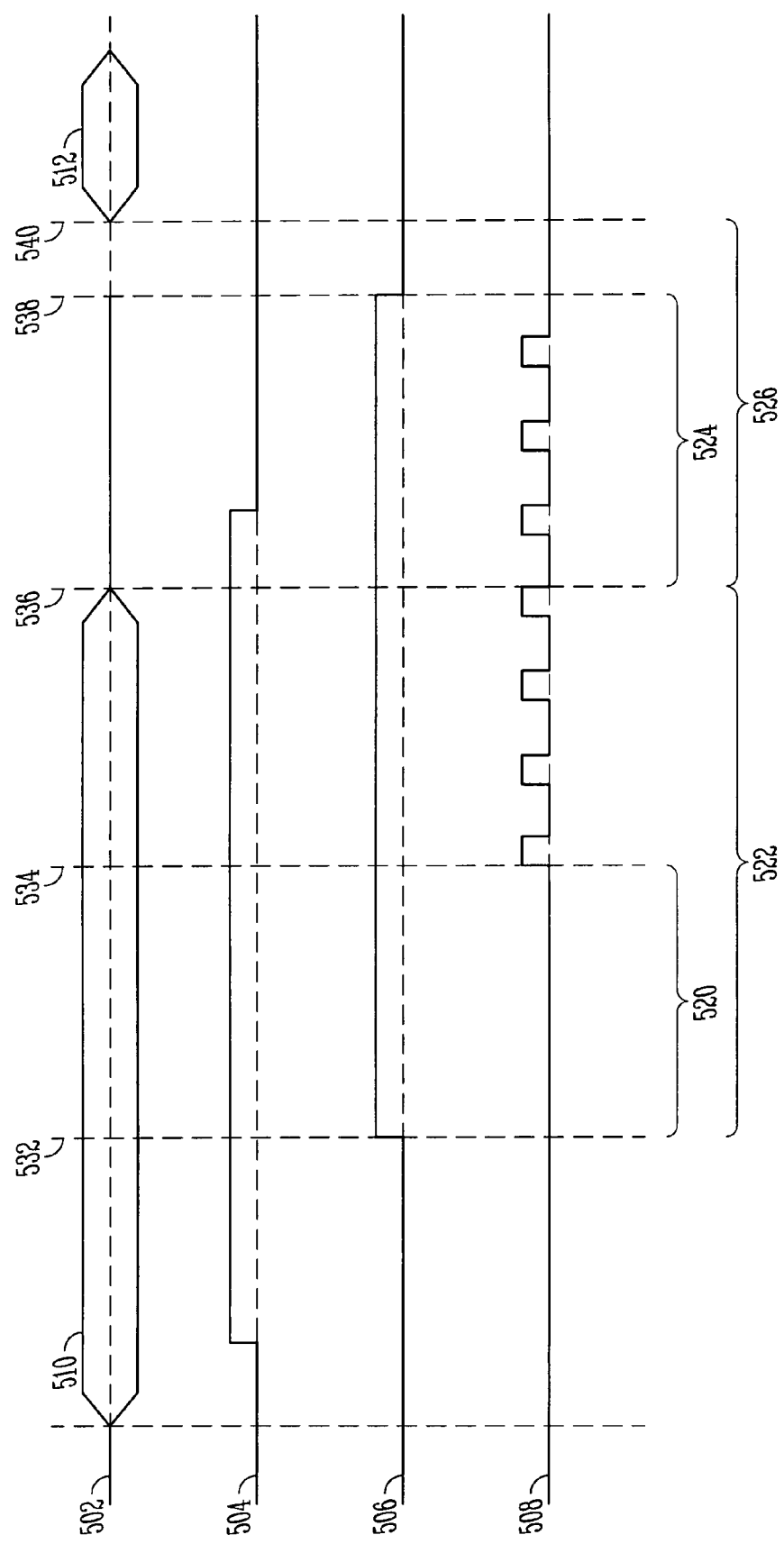
FIG. 5 illustrates an example of a timing diagram in accordance with an embodiment of the present invention.

FIG. 5 illustrates an example of a timing diagram in accordance with an embodiment of the present invention. Signal 502 represents the "on air" signal as it is seen indeed. Envelope 510 represents a received frame on the air, and envelope 512 represents a response frame on the air. Signal 504, referred to as "Signal_On_Air," represents signal 502 after it is processed by the PHY device and presented to the MAC device, and indicates, when high, that the PHY device is receiving the received frame 510.

Signal 506 represents a signal from the PHY device to the MAC device, which indicates, when high, that the PLCP header 302 has been received by the PHY device and is ready to be processed by the MAC device. Finally, signal 508 represents bits from the data frame 404, as they are sent from the PHY device to the MAC device.

Several delays are illustrated by the timing diagram. A first delay 520 represents a variable amount of time between a first time 532 when signal 506 indicates that the PLCP header 302 is ready and a second time 534 when signal 508 includes a first byte of data from the data frame 404. A second delay 522 represents a variable amount of time between the first time 532 when the PLCP header 302 is ready, and a third time 536 when the on air signal 502 is dropped. Time period 524 represents the IFS, which is a fixed time increment between the third time 536 when the on air signal 502 is dropped, and a fourth time 538. The third delay 526 represents a variable amount of time between the third time 536 when the on air signal 502 is dropped, and a fifth time 540 when the integrity check for the received data is completed (i.e., by processing the FCS 406), and when the response frame can be transmitted by the PHY device as signal 512.

In certain implementations of the MAC protocol, the MAC device transmits a response frame almost exactly when the SIFS expires (i.e., at time 538). In other words, delay 526 equals SIFS period 524 and ends at fourth time 538, which represents the end of the SIFS. However, because the MAC protocol adds some overhead, this is not always the case. The MAC protocol overhead can lengthen delay 526, because the MAC device performs a sequence of validation and control processes after receiving a sent frame and prior to issuing a response frame.

One example of a MAC device task is the preparation and transmission of an ACK Frame (e.g., signal 512) after receiving a Data or Management Frame (e.g., signal 510). The ACK Frame should start being transmitted over the air interface in exactly an SIFS time increment 524 after completion of receipt of the Data or Management Frame. However, prior to issuing a response frame (e.g., the ACK Frame), the MAC device 204 performs some processing. This processing includes:

1. Extracting data from the PLCP header 304 (FIG. 3) of the received frame, which includes the rate and length of the MPDU 306 (FIG. 3).

2. Examining an address field of the MPDU 306 to make sure it is destined for the receiving station.

3. Examining the PLCP Header Integrity Control 318 (FIG. 3) and FCS 406 (FIG. 4) to determine the integrity of the PLCP header 304 and the MPDU 306. No response frame is sent if an error is found.

4. Switching the PHY device 202 (FIG. 2) from receive mode to transmit mode when the received frame is acceptable and is destined for the receiving station.

If the MAC protocol does not transmit the response frame shortly after expiration of the SIFS, another network station may start transmitting over the air interface and the source may not receive the response frame in time. If the source does not receive the response frame in time, the source attempts to retransmit the frame. Retry counters limit the number of times a source will retransmit a single frame. If the MAC protocol is not efficiently implemented, retransmissions may be frequent, which increases bandwidth consumption. In addition, if a source's retry counter reaches its limit, then the frame is discarded. Due to delays in the coding and modulation schemes used for wireless media, the amount of time that remains after receiving a message and before the SIFS (or other IFS) expires may be insufficient, in some circumstances.

There are a number of cases when it is desirable to transmit a response frame as soon as possible after the SIFS (or other IFS) expires. These cases include, for example: 1) transmitting an ACK after a frame is received; 2) transmitting a fragment after an ACK is received; 3) transmitting a Clear to Send (CTS) after a Request to Send (RTS) is received; 4) transmitting a frame after a CTS is received; and 5) transmitting an ACK after a PC-Poll is received.

The method and apparatus of embodiments of the present invention provide a MAC device that performs the necessary validation and control processes in a manner that increases the likelihood that a response will be sent as quickly as possible upon expiration of an IFS (e.g., the SIFS). The method and apparatus of embodiments of the present invention provide a MAC device that does not require a faster clock or processor in order to complete the validation and control processes before the IFS expires.

Using other methods, a MAC device waits to receive an entire PPDU frame (e.g., FIG. 3) before determining if the frame is destined for the receiving station, and checking the PLCP Header Integrity Control field (e.g., field 318, FIG. 3) and FCS (e.g., field 406, FIG. 4). If the PLCP Header Integrity Control and FCS are correct, then the MAC prepares and sends the response frame. As described previously, the necessary validation and control processes may take too long, using other methods, and it may be impossible to transmit the response frame immediately upon expiration of the IFS.

In various embodiments, the method and apparatus of the present invention causes the MAC device to perform pre-processing and parallel processing during idle times, so that a response frame can be issued as soon as possible after expiration of the IFS. This pre-processing and parallel processing may include some or all of the following:

1) While waiting for the first data byte (e.g., signal 508, FIG. 5), extracting the data rate and frame size from the PLCP header 304 (FIG. 3) and preparing the transmit antenna accordingly, at a time that is earlier than in other methods. This is described more fully in conjunction with FIGS. 6 and 7.

2) Processing the stream of bytes from the PHY device to a receiver FIFO (first-in, first-out) buffer, and filtering addresses. This is described more fully in conjunction with FIG. 6.

3) In parallel:

Looking for the drop of the Signal_On_Air signal 504 (FIG. 5), and starting an IFS timer to know when the IFS will expire and when an appropriate response frame should be issued. This is described more fully in conjunction with FIG. 8.

Looking for the drop of the Rx_Frame signal 506 (FIG. 5) to know that the entire frame has been received by the PHY device, and beginning to issue a response when that happens. This is described more fully in conjunction with FIG. 10.

Figure 11:
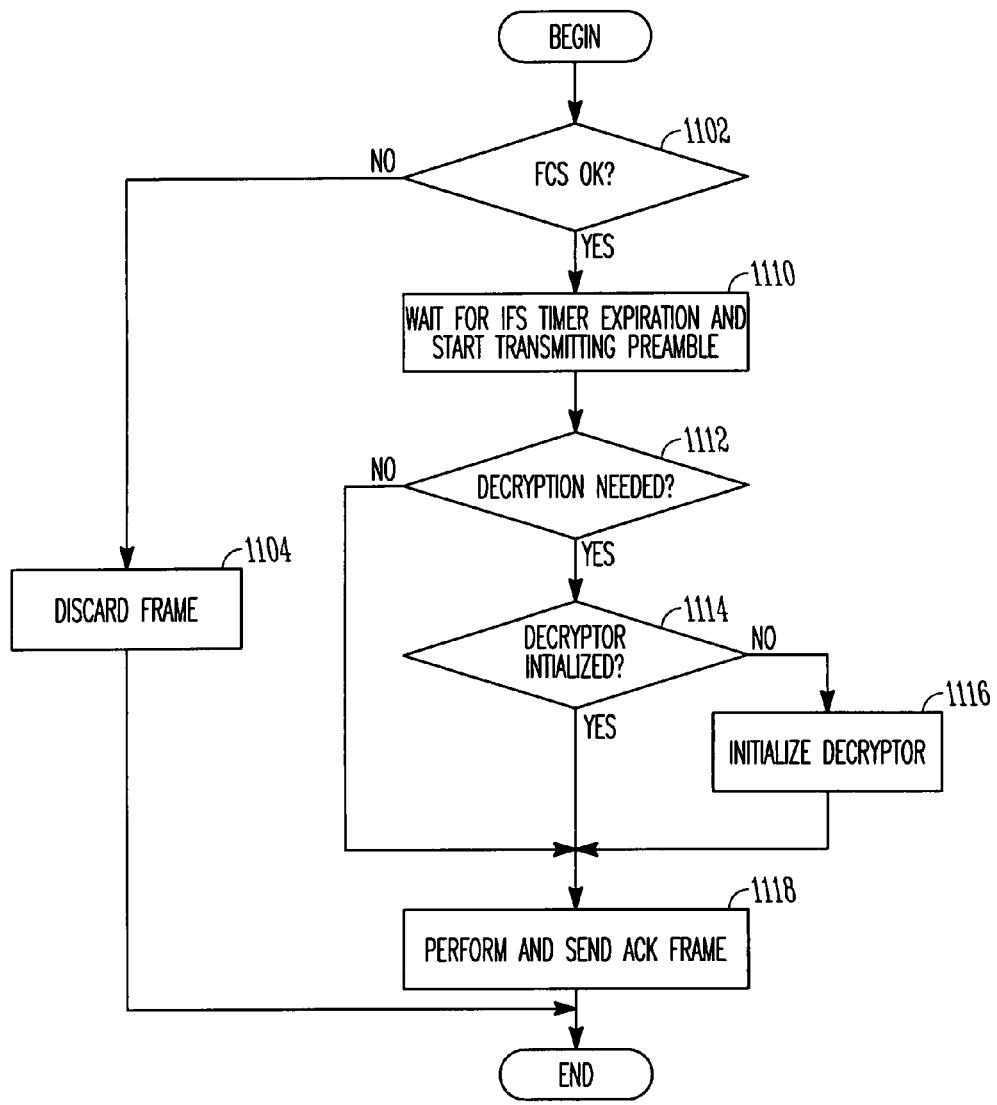
FIG. 11 is a flowchart of a procedure for preparing and transmitting a response frame in accordance with an embodiment of the present invention.

As soon as possible upon expiration of the IFS timer, powering up the transmit circuitry and powering-down the receive circuitry, and beginning to transmit the PLCP preamble 302 (FIG. 3) of the response frame, and preparing and releasing the data portion of the response frame. This is described more fully in conjunction with FIG. 11.

4) Completing processing of the received frame. This is described more fully in conjunction with FIG. 9.

Figure 6:
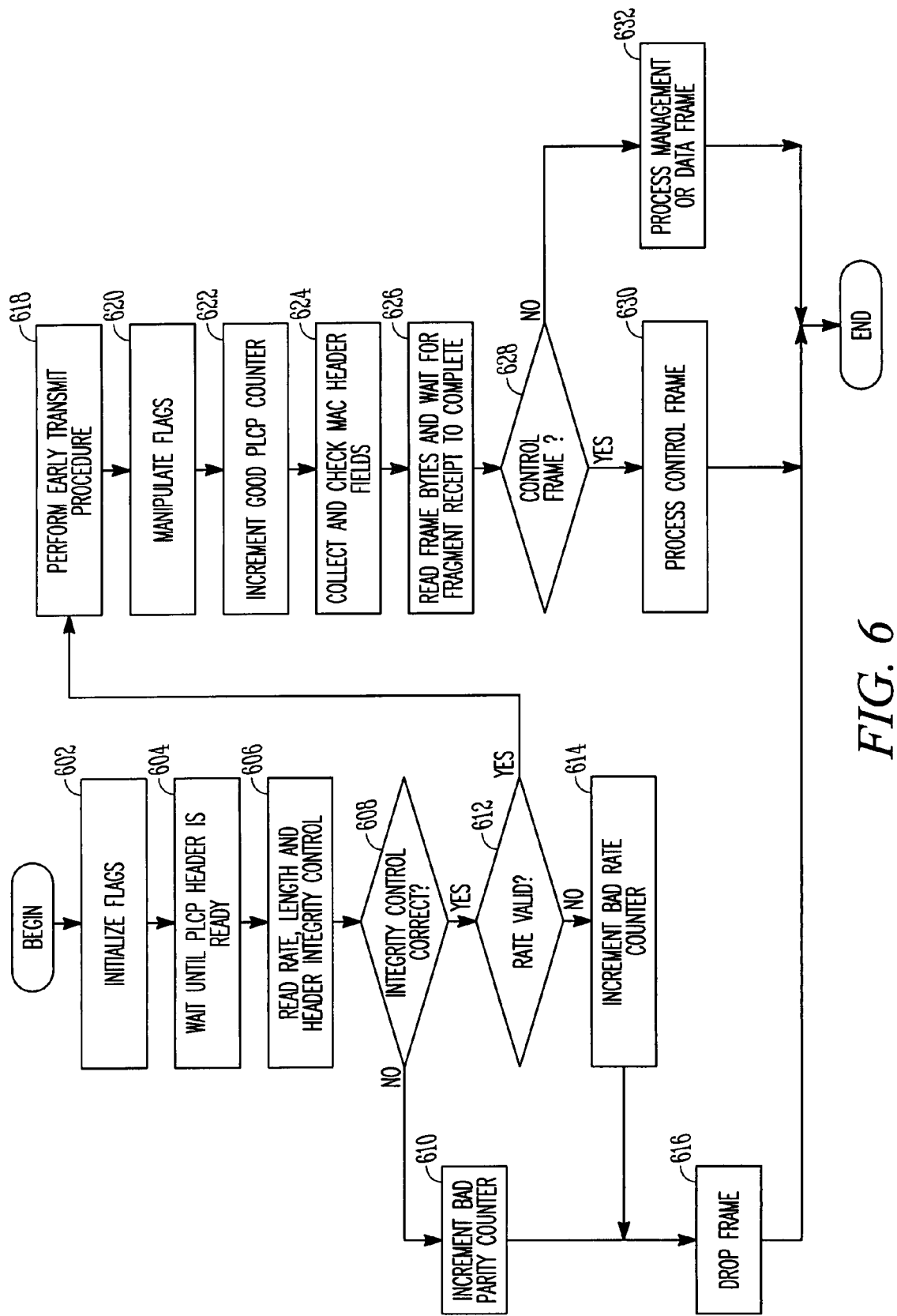
FIG. 6 is a flowchart of a procedure for receiving a frame and sending a response in accordance with an embodiment of the present invention.

FIG. 6 is a flowchart of a procedure for receiving a frame and sending a response in accordance with an embodiment of the present invention. In one embodiment, the procedure is performed by microcode executed by the MAC device 204 (FIG. 2), and is initiated when the MAC device receives an indication that a PLCP preamble 302 (FIG. 3) is starting to be received. In one embodiment, this indication is the Signal_On_Air signal 504 (FIG. 5) from the PHY device 202 (FIG. 2).

Figure 8:
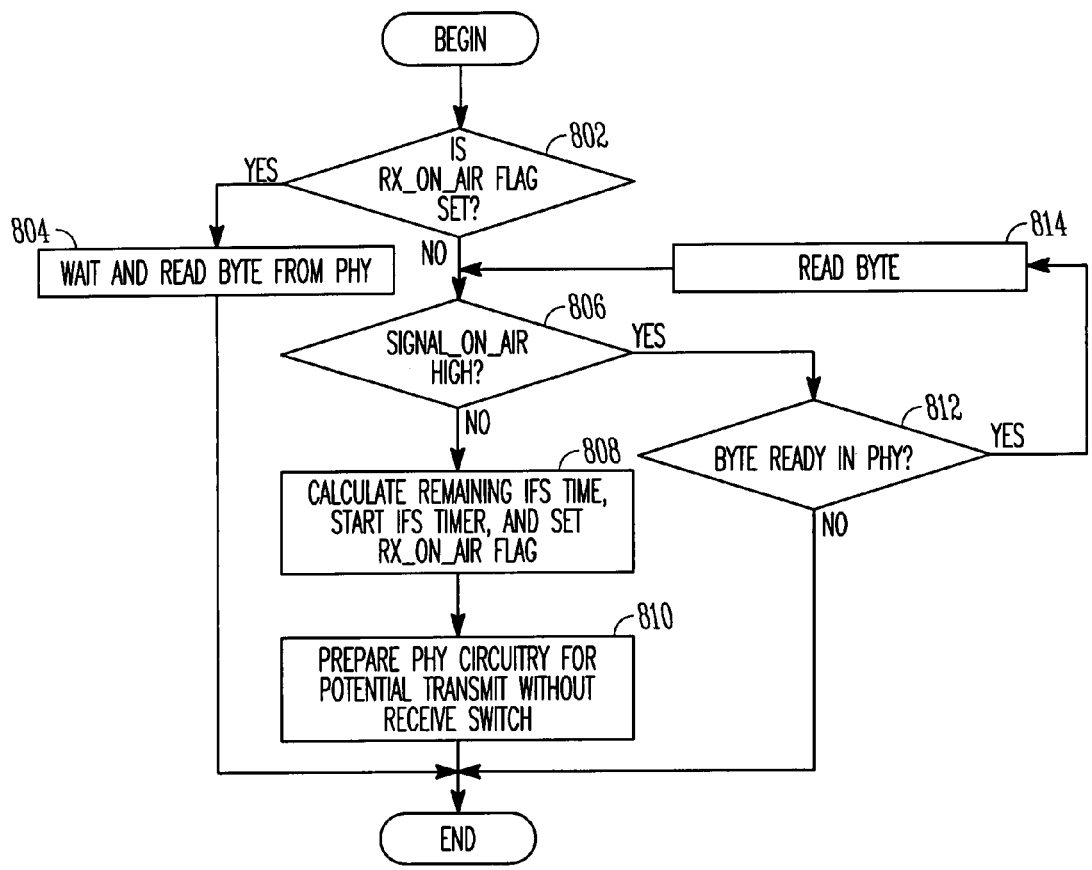
FIG. 8 is a flowchart of a procedure for reading bytes and waiting for the frame to complete in accordance with an embodiment of the present invention.

In one embodiment, the method begins, in block 602, by initializing various flags. For example, this could involve resetting (e.g., clearing) an Rx_On_Air flag, which is evaluated and manipulated as described later in conjunction with blocks 802 and 808 (FIG. 8).

In block 604, the method waits until the Rx_Frame signal 506 (FIG. 5) indicates that the PLCP header 304 (FIG. 3) has been received and is ready to be evaluated by the MAC device. In one embodiment, this is evident when the MAC device has sensed that the Rx_Frame signal 506 has gone high.

Next, in block 606, the data rate 314 (FIG. 3), length 316, and PLCP Header Integrity Control 318 are extracted from the PLCP header 304. In addition, in one embodiment, Signal to Noise Ratio (SNR), Received Signal Strength Indication (RSSI), and antenna ID are received from the PHY device 202 (FIG. 2). These values are retained for later use.

In block 608, a determination is made whether the PLCP header 304 is correct by processing the PLCP Header Integrity Control 318. If this field indicates that the PLCP header 304 may have been corrupted by noise, then a "bad parity counter" is incremented, in block 610. The "bad parity" counter is used by other elements of the system to determine the transmission quality of the air interface. The frame is then dropped, in block 616, and the procedure ends. When the frame is dropped, no further processing of the frame occurs, and no response frame is prepared or sent.

If the PLCP header is acceptable, then a determination is made whether the data rate extracted from the PLCP header 304 is a rate that is valid according to the PHY specification. If the rate is not valid, then a "bad rate" counter is incremented, in block 614, the frame is dropped, in block 616, and the procedure ends. The "bad rate" counter is used by other elements of the system to determine whether some modulation control problems may be present between the transmitting station (or AP) and the receiving station.

If the data rate is acceptable, then an early transmission setup procedure is performed, in block 618. This procedure is described in more detail in conjunction with FIG. 7, which is a flowchart of a procedure for early transmit setup in accordance with an embodiment of the present invention. Based on the type of frame that is being received, the procedure of FIG. 7 performs some preparation tasks for a response frame, which may or may not be sent in response to the received frame.

There are three defined frame types, and a fourth, currently reserved type. The three defined frame types are: control, data, and management. Within each frame type, there are several sub-types.

The six control frame subtypes and their lengths are: Request To Send (RTS) (20 bytes); Clear To Send (CTS) (14 bytes); Acknowledge (ACK) (14 bytes); Power Save (PS) Poll (20 bytes); Contention Free (CF) End (20 bytes); and CF End+CF ACK (20 bytes).

Data frames are of a variable length, which can range from 28 to 2346 bytes (i.e., more than 20 bytes). In some cases, a data frame can include an entire message. In other cases, a data frame may include only a "fragment" of a message. In order to more robustly exchange messages over a noisy air interface, long messages are sometimes broken into two or more, same-size fragments, where each fragment is transmitted in a separate data frame. Each time a fragment is received, the receiving station sends an ACK control frame in response. After receiving the ACK, the transmitting station then sends the next fragment, assuming the fragment that it previously sent was not the last. When a message is fragmented, the sequence control field 420 (FIG. 4) of the MAC header 402 indicates the placement of the individual fragment among the set of fragments. Also, a "more fragments" bit in the frame control field 410 indicates whether the current fragment is the last fragment.

Management frames are of a variable length of at least 28 bytes (i.e., more than 20 bytes). Basically, management frames are used to control the relationship of a WLAN station with other stations and/or with a BSS. The eleven management frame subtypes are: Beacon; Probe Request; Probe Response; Authentication; Deauthentication; Association Request; Association Response; Reassociation Request; Reassociation Response; Disassociation; and Announcement Traffic Indication Message.

Figure 7:
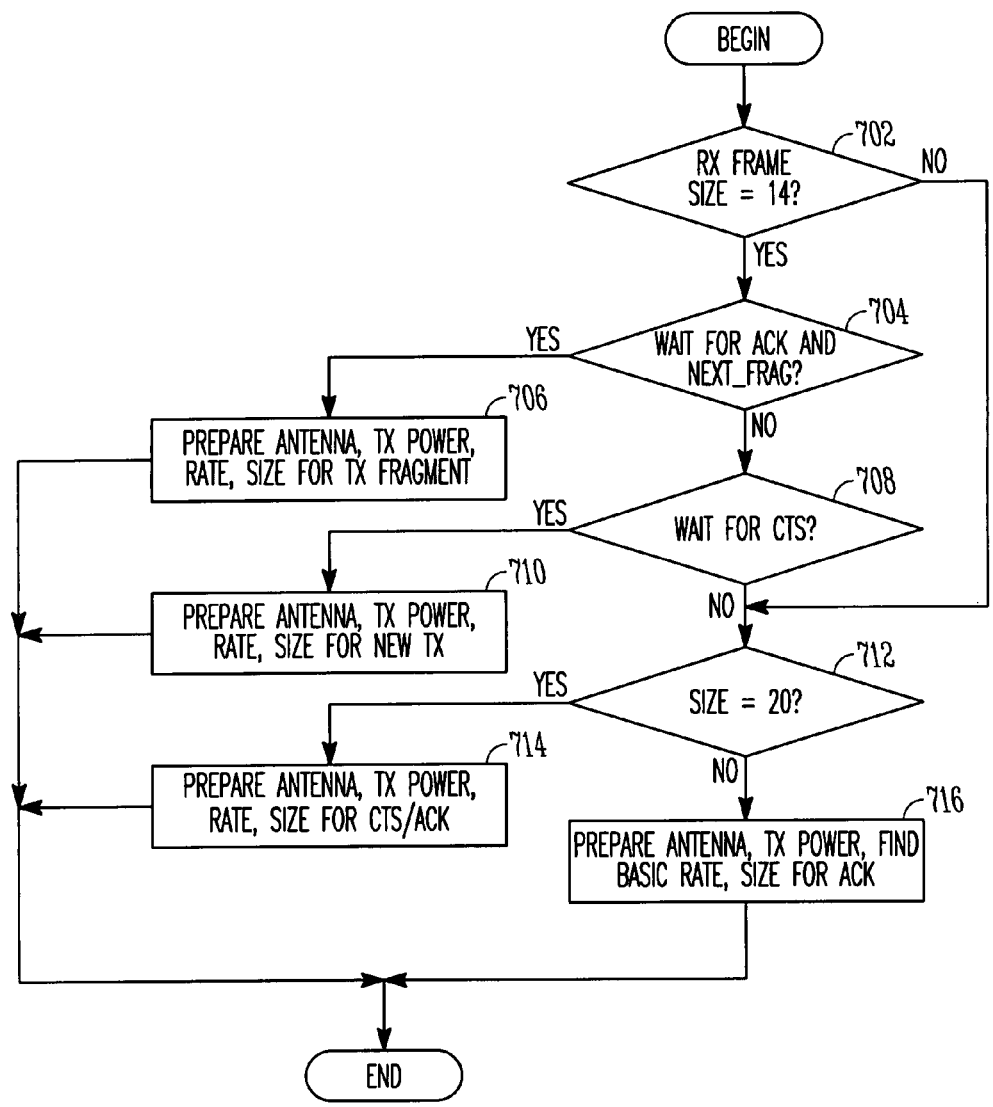
FIG. 7 is a flowchart of a procedure for early transmit setup in accordance with an embodiment of the present invention.

Referring to FIG. 7, the procedure of preparing to send a response frame begins, in block 702, by determining whether the length extracted from the PLCP header indicates that the frame being received (i.e., the "rx frame") has a size equal to 14 bytes. If so, this indicates that the rx frame includes a CTS or an ACK message. A first station receives an ACK message from a second station in response to the first station having previously sent a message fragment to the second station. A first station receives a CTS message from a second station in response to the first station having previously sent an RTS message.

Referring back to block 702, if it is determined that the rx frame has a size equal to 14, this indicates that the rx frame is an ACK frame or a CTS frame. When this is the case, then in block 704, a determination is made whether the receiving station is waiting for an ACK message, and whether a next fragment ("next_frag") exists. In other words, a determination is made whether the receiving station is in the process of sending a fragmented message, and whether the last fragment has already been transmitted.

If the receiving station has been waiting for an ACK message, and one or more fragments remain to be transmitted, then an assumption is made that the frame being received is an ACK frame, and the receiving station prepares to send a next fragment in block 706. In one embodiment, this involves preparing the selected antenna and the transmit power for transmission of a next fragment. In one embodiment, the ID of the antenna used during the receive mode may be stored. In addition, in one embodiment, because the receiving station knows the rate and length used to transmit previous fragments, the procedure stores the rate and length for the next fragment to be transmitted, so that these values can be incorporated into the appropriate fields of the PLCP header 304 that will be included with the next fragment. After these initial preparations for transmitting a next fragment have been completed, in block 706, the procedure ends.

If, in block 704, the receiving station is not waiting for an ACK, or there is, no next fragment to be sent (i.e., the receiving station already transmitted the last fragment of the message), then a determination is made, in block 708, whether the receiving station is waiting for a CTS message, which also has a frame size of 14 bytes. The receiving station would be waiting for a CTS message if it had previously sent an RTS message.

If the receiving station has been waiting for a CTS message, then an assumption is made that the frame being received is a CTS frame, and the receiving station prepares to send a new data frame, in block 710. In one embodiment, this involves preparing the selected antenna and the transmit power for transmission of a new data frame, as described above. In addition, in one embodiment, because the receiving station knows the rate and length that will be used to transmit the new data frame, the procedure stores the rate and length for the data frame to be transmitted, so that these values can be incorporated into the appropriate fields of the PLCP header 304 that will be included with the new data frame. After these initial preparations for transmitting a new data frame have been completed, in block 710, the procedure ends.

If, in block 708, the receiving station is not waiting for a CTS, or if the rx frame size does not equal 14, as determined in block 702, then a determination is made, in block 712, whether the rx frame size equals 20. If so, an assumption is made that the frame being received is either an RTS, a PS-Poll, a CF-End, or a CF-End+ACK control frame. If the frame being received is an RTS or a PS-Poll, the appropriate responses, respectively, would be a CTS or an ACK, each of which are 14 bytes in length. If the frame being received is a CF-End or a CF-End+ACK, no response is necessary. However, in one embodiment, because the receiving station does not know for certain what type of frame is being received, the receiving station performs some transmit preparations, regardless of whether or not a response actually will be sent. These preparations may be ignored or reversed, if no response is ultimately sent.

When the rx frame size is equal to 20, then in block 714, the receiving station prepares to send a CTS or ACK response, in block 714. In one embodiment, this involves preparing the selected antenna and the transmit power for transmission of a CTS or ACK, as described above. In addition, in one embodiment, because the receiving station knows the rate and length that will be used to transmit the CTS or ACK, the procedure stores the rate and length for the CTS or ACK to be transmitted, so that these values can be incorporated into the appropriate fields of the PLCP header 304 that will be included with the new data frame. After these initial preparations for transmitting a CTS or ACK have been completed, in block 714, the procedure ends.

Referring back to block 712, if the rx frame size is not equal to 20, then an assumption is made that the frame being received is a data or management frame. In this case, the receiving station prepares to send an ACK response, in block 716, as this is the appropriate response for either a data or management frame. In one embodiment, this involves preparing the selected antenna and the transmit power for transmission of an ACK, as described above. In addition, in one embodiment, because the receiving station knows the rate and length that will be used to transmit the ACK, the procedure stores the rate and length for the ACK to be transmitted, so that these values can be incorporated into the appropriate fields of the PLCP header 304 that will be included with the ACK frame. After these initial preparations for transmitting the ACK have been completed, in block 716, the procedure ends.

The procedure described in conjunction with FIG. 7 accomplishes some preparations for sending an earlier response frame. Using embodiments of the present invention, one or more of the following response transmission preparations can be started (and in some cases completed) prior to drop of the Signal_On_Air signal 504: the transmit antenna can be selected, the transmit power can be selected, the response frame rate can be determined, and/or the response frame size can be determined. These preparations are achieved by predicting what type or types of response frames the station might prepare to send, based on the size of the frame being received and on the former state of the message exchange sequence (e.g., whether or not the station had been waiting for a particular type of message).

Returning back to FIG. 6, after performing the early transmission setup procedure, various flags are then manipulated, in block 620. In one embodiment, a NAV_Not_Zero flag may be set. This flag indicates that a NAV timer has a nonzero value. In accordance with an IEEE Std 802.11 requirement, a duration field of the receiving frame should be compared against the remaining time in the NAV timer in order to avoid a NAV reduction. In addition, a Receive_In_Progress flag may be set, indicating that the station is currently receiving a frame.

In block 622, a "good PLCP" counter is incremented. The "good PLCP" counter is used by other elements of the system to determine the transmission quality of the air interface.

In block 624, the MAC device 204 (FIG. 2) collects and checks values within various fields within the MAC header 402 (FIG. 4), after those fields have been received by the station. In one embodiment, these values include the frame control value in the frame control field 410, the duration value in the duration/ID field 412, and one or more address values in the address fields 414, 416, 418, and/or 422.

In block 626, the procedure then reads bytes as they become ready in the PHY device 202 (FIG. 2), while waiting for receipt of the frame to complete. FIG. 8 is a flowchart of a procedure for reading bytes and waiting for the frame to complete, in accordance with an embodiment of the present invention. Typically, it is up to the MAC device 204 (FIG. 2) to determine when receipt of a frame has completed by observing the Signal_On_Air signal 504 from the PHY device 202. An interrupt is not generated by the PHY device 202 when this occurs.

The method begins, in block 802, by determining whether the Rx_On_Air flag is set to a value that indicates that the drop of the Signal_On_Air signal (e.g., signal 504, FIG. 5) has been previously recognized (e.g., in block 806, described below). If the Rx_On_Air flag is set, then the MAC device 204 waits, if appropriate, and reads the byte or bytes of frame data (e.g., signal 508, FIG. 5) from a FIFO queue in the PHY device 202 (FIG. 2), and the procedure ends.

If the Rx_On_Air flag is not set, then an iterative process of polling the Signal_On_Air signal 504 and reading bytes from the FIFO is performed. In one embodiment, this iterative process is performed as follows. In block 806, a determination is made whether the Signal_On_Air signal 504 (FIG. 5) indicates that data is still being received (i.e., the signal is high).

If not, then in block 808, the time remaining before expiration of the appropriate IFS (e.g., the SIFS, DIFS, PIFS, EIFS or other time period) is calculated, and an "IFS timer" is initialized and started. The IFS timer keeps track of how much time remains before the applicable IFS expires. In addition, in one embodiment, the Rx_On_Air flag is set, in block 808, indicating that the drop of the On Air signal has been recognized.

In block 810, a portion of the PHY circuitry is prepared for a potential response transmission, without actually switching the PHY device 202 (FIG. 2) out of the receive mode. In one embodiment, preparation involves powering on a portion of the PHY circuitry. The method then ends.

Referring back to block 806, if the Signal_On_Air signal 504 indicates that data is still being received, then a determination is made, in block 812, whether a byte is ready in the FIFO queue of the PHY device 202. If no byte is ready, the procedure ends. If a byte is ready, then the MAC device 204 reads the byte, in block 814, and the procedure iterates as illustrated in FIG. 8.

Referring back to FIG. 6, after all frame bytes have been read, and the receipt of the frame has been completed, then a determination is made, in block 628, whether the frame is a control frame. This determination is made, in one embodiment, by checking the frame control field 410 (FIG. 4) of the MAC header 402, to see what type of frame is indicated. If the frame is a control frame, then the control frame is processed and a response is sent, if necessary, in block 630, and the procedure ends. Processing a control frame is described in more detail in conjunction with FIG. 9. If the frame is not a control frame, indicating that it is a data or management frame, then in block 632, the data or management frame is processed, an ACK is sent, the frame is released to the host system 206 (FIG. 2), and the procedure ends. Processing a data or management frame is described in more detail in conjunction with FIG. 10.

Figure 9:
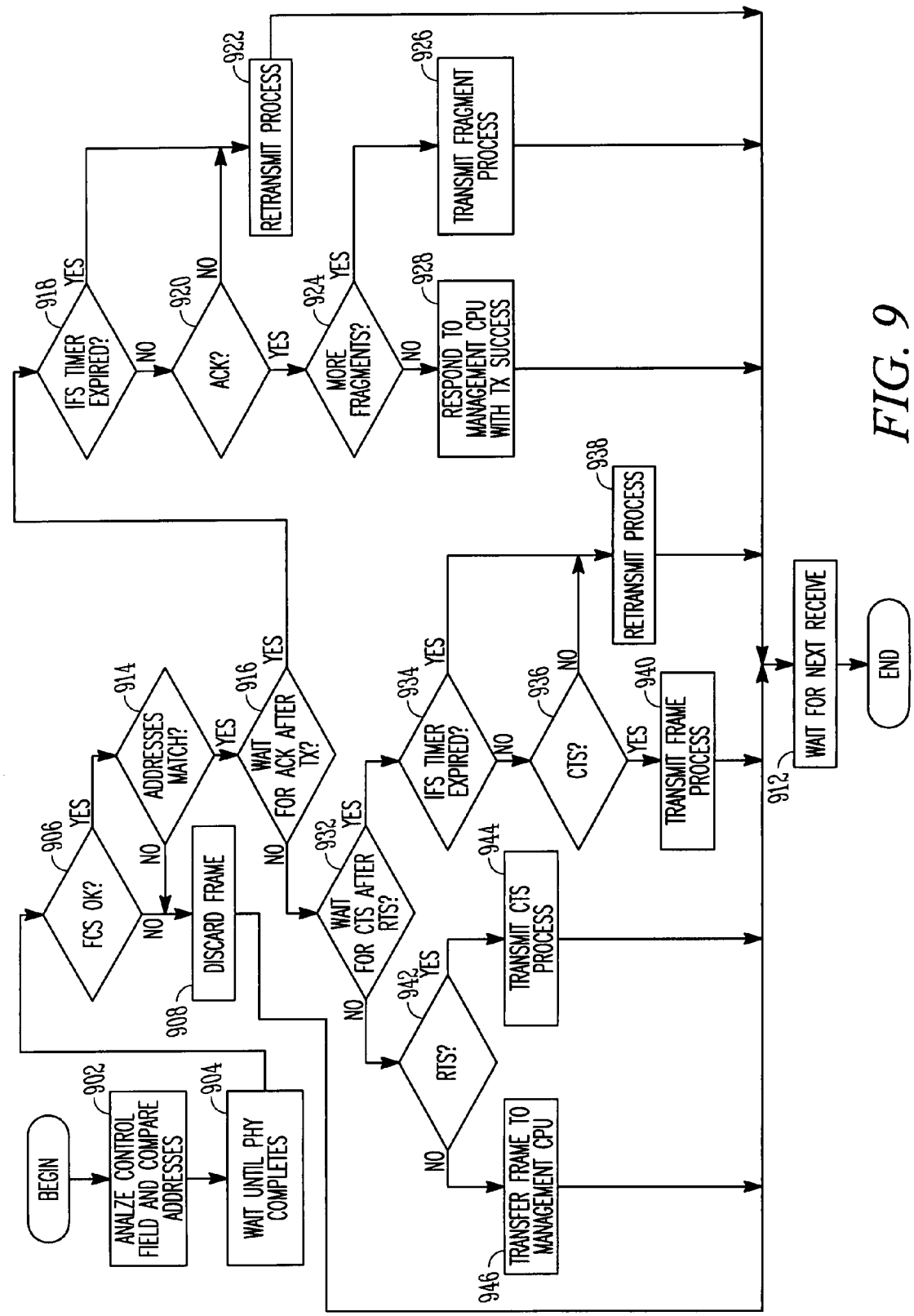
FIG. 9 is a flowchart of a procedure for processing a control frame in accordance with an embodiment of the present invention.

FIG. 9 is a flowchart of a procedure for processing a control frame in accordance with an embodiment of the present invention. The method begins, in block 902, by obtaining the value in the frame control field 410 (FIG. 4) and the relevant addresses (e.g., source and destination addresses) from the MAC header 402.

In block 904, the procedure then waits until the PHY device 202 (FIG. 2) has completed its receipt of the frame. Once that occurs, then the FCS 406 (FIG. 4) is checked, in block 906, to determine whether or not the MPDU 306 (FIG. 3) was correctly received. If not, then the frame is discarded, in block 908, the station prepares itself to receive a next message, in block 910, and the method ends.

If the FCS 406 indicates that the MPDU 306 was correctly received, then the receive address field 414 (FIG. 4) of the MAC header 402 is evaluated, in block 914, to determine whether the address value matches the address of the receiving station. If not, then the frame is discarded, in block 908, the station prepares itself to receive a next message, in block 910, and the method ends.

If the address does match, then a determination is made, in block 916, whether the station has been waiting to receive an ACK frame, after having previously transmitted a fragment or data frame. If so, then in block 918, a determination is made whether the IFS timer has expired. The IFS timer was initialized in block 808 (FIG. 8), and expiration of the IFS timer signals the end of the applicable IFS (e.g., the SIFS, DIFS, PIFS, EIFS or other time period), and a time when transmission of a response ideally should begin.

If the IFS timer has expired, then in one embodiment it is assumed that the message was received too late, whether or not it is an ACK. In that case, a retransmission process is performed, in block 922, in which the previously sent message is sent again if the retransmission counter has not reached its limit. The procedure then prepares to receive a next message, in block 912, and ends. Preparation to receive a next message may involve manipulating various flags and registers, and switching the PHY device 202 (FIG. 2) from transmit to receive mode.

If the IFS timer has not expired, in block 918, then a determination is made, in block 920, whether the message is an ACK frame. This determination is made, in one embodiment, by evaluating the frame control field 410 (FIG. 4) of the MAC header 402. If the message is not an ACK frame, then the retransmission process is performed, in block 922, and the procedure prepares to receive a next message, in block 912, and ends.

If the message is an ACK frame, then a determination is made, in block 924, whether more fragments of the fragmented message have yet to be transmitted. If one or more fragments have yet to be transmitted, then in block 926, a transmit fragment process is performed. In one embodiment, as soon as the IFS timer expires, the preamble 302 (FIG. 3) of the next fragment message starts to be transmitted, whether or not all of the remaining data for the message is ready. Transmitting a message as soon as possible after IFS expiration is described later in more detail in conjunction with FIG. 11. The procedure then prepares to receive a next message, in block 912, and ends.

If no more fragments remain to be transmitted, as determined in block 924, then in block 928, the procedure sends a message to the management CPU within the host system 206 (FIG. 2), indicating a successful message transmission. The procedure then prepares to receive a next message, in block 912, and ends.

Referring back to block 916, if the station is not waiting for an ACK frame, then a determination is made, in block 932, whether the station has been waiting to receive a CTS frame after having previously transmitted an RTS frame. If so, then in block 934, a determination is made whether the IFS timer has expired.

If the IFS timer has expired, then in one embodiment it is assumed that the message was received too late, whether or not it is an CTS. In that case, a retransmission process is performed, in block 938, in which the previously sent RTS message is sent again if the retransmission counter has not reached its limit. The procedure then prepares to receive a next message, in block 912, and ends.

If the IFS timer has not expired, in block 934, then a determination is made, in block 936, whether the message is a CTS frame. This determination is made, in one embodiment, by evaluating the frame control field 410 (FIG. 4) of the MAC header 402. If the message is not a CTS frame, then the retransmission process is performed, in block 938, and the procedure prepares to receive a next message, in block 912, and ends.

If the message is a CTS frame, then in block 940, a transmit frame process is performed. In one embodiment, as soon as the IFS timer expires, the preamble 302 (FIG. 3) of the frame starts to be transmitted, whether or not all of the remaining data for the message is ready. Transmitting a message as soon as possible after IFS expiration is described in more detail later in conjunction with FIG. 11. The procedure then prepares to receive a next message, in block 912, and ends.

Referring back to block 932, if the station has not been waiting for a CTS frame, then in block 942, a determination is made whether the message is an RTS message. This determination is made, in one embodiment, by evaluating the frame control field 410 (FIG. 4) of the MAC header 402. If the message is not an RTS frame, then the frame is transferred to the management CPU for further processing, in block 946, and the procedure prepares to receive a next message, in block 912, and ends.

If the message is an RTS frame, then in block 944, a transmit CTS process is performed. In one embodiment, as soon as the IFS timer expires, the preamble 302 (FIG. 3) of the CTS frame starts to be transmitted, whether or not all of the remaining data for the message is ready. Transmitting a message as soon as possible after IFS expiration is described in more detail later in conjunction with FIG. 11. The procedure then prepares to receive a next message, in block 912, and ends.

Most of the responses discussed in conjunction with FIG. 9 are handled by the MAC device 204 (FIG. 2), as they relate to sequences of control frames that are sent or received by a station. When data or management frames are received, then they are processed and sent to the host system 206 (FIG. 2), as was briefly explained in conjunction with block 632 (FIG. 6).

Figure 10:
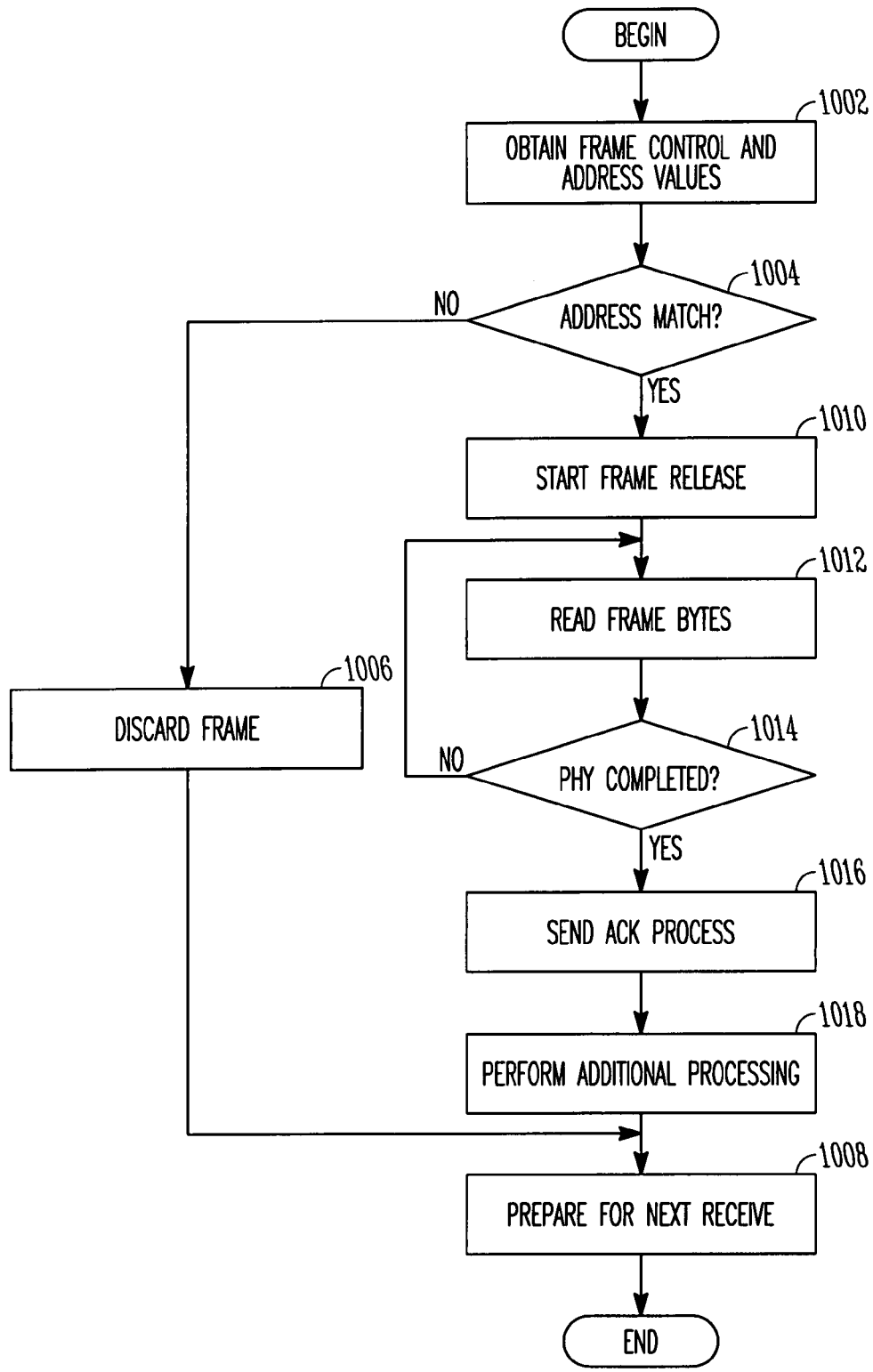
FIG. 10 is a flowchart of a procedure for processing a data or management frame in accordance with an embodiment of the present invention.

FIG. 10 is a flowchart of a procedure for processing a data or management frame (e.g., in block 632, FIG. 6) in accordance with an embodiment of the present invention. The method begins, in block 1002, by obtaining the value in the frame control field 410 (FIG. 4) and the relevant addresses (e.g., source and destination addresses) from the MAC header 402.

A determination is then made, in block 1004, whether or not the receive address field 414 (FIG. 4) of the MAC header 402 matches the address of the receiving station. If not, then the frame is discarded, in block 1006, the station prepares itself to receive a next message, in block 1008, and the method ends.

If the address does match, then the procedure starts the process of releasing the data or management frame to the host system 206 (FIG. 2), in block 1010. The procedure then reads the remaining bytes, if any, from the PHY device, in block 1012, until the PHY device 202 (FIG. 2) has completed its receipt of the frame, as indicated by decision block 1014. In one embodiment, reading the remaining frame bytes involves performing some or all of the blocks of the process described in conjunction with FIG. 8.

Once the PHY device has completed its receipt of the entire frame, then a send ACK process is performed, in block 1016. A method of sending an ACK in accordance with an embodiment of the invention is described in more detail in conjunction with FIG. 11. After sending the ACK, additional processing is performed, in block 1018, to complete releasing the frame to the host system and to appropriately handle directed unicast frames, beacons or probes. The method then prepares to receive the next frame, in block 1008, and the method ends.

The method begins, in block 1102, by checking the FCS 406 (FIG. 4) to determine whether or not the MPDU 306 (FIG. 3) was correctly received. If not, then the frame is discarded, in block 1104, and the method ends.

If the FCS 406 indicates that the MPDU 306 was correctly received, then the station waits for the IFS timer to expire, and begins transmitting the preamble 302 (FIG. 3) of the ACK frame, in block 1110. In one embodiment, the process does not need to wait until all the ACK data is ready to send to the PHY device 202 (FIG. 2) before beginning transmission of the preamble, although all data may be ready at this time. If all data is not ready, then preparing the remaining ACK data can be performed while the preamble is being sent.

In one embodiment, a determination is made, in block 1112, whether or not decryption of the frame being received is needed. In one embodiment, this is determined by checking a "WEP" subfield within the frame control field 410 (FIG. 4) of the received frame. WEP is an acronym for "Wired Encryption Privacy", which is an encryption mechanism that may or may not be used to encrypt and decrypt messages. If decryption is needed, then a determination is made in block 1114, whether the decryptor, which typically resides in the MAC device 204 (FIG. 2), has been initialized. If not, the decryptor is initialized in block 1116.

After initializing the decryptor, or if the decryptor is already initialized, or if decryption is not needed, then preparation of the ACK frame data is completed, if necessary, in block 1118. The MAC device 204 (FIG. 2) sends the ACK frame data to the PHY device 202. After transmitting the preamble 302 (FIG. 3) and PLCP header 304, the PHY device 202 transmits the MPDU 306, which includes the ACK frame.

The various embodiments of the present invention enable a response to be sent as soon as possible after expiration of the IFS (e.g., the SIFS, DIFS, PIFS, EIFS, or other time period), because the pre-processing performed by the various embodiments increases the likelihood that the response frame will be ready when the IFS expires. This is also accomplished by starting to transmit the preamble 302 (FIG. 3) upon IFS expiration, whether or not the rest of the MPDU 306 is ready. By transmitting a response as soon as possible upon IFS expiration, the likelihood that other stations will start message transmissions before a response can be sent is decreased, thus also decreasing re-transmissions, and increasing the available bandwidth.

Although the individual operations of the procedures of FIGS. 6–11 are illustrated and described as separate operations, one or more of the individual operations may be performed concurrently. Further, nothing requires that the operations be performed in the orders illustrated. The operations of the procedures of FIGS. 6–11 may be performed, for example, by the various functional elements of MAC device 204 (FIG. 2), PHY device 202, or may be performed by other suitably configured hardware.

Thus, a method and apparatus have been described which perform MAC device overhead operations, enabling a MAC device to issue a response frame as soon as possible upon expiration of an IFS (e.g., a SIFS, DIFS, PIFS, EIFS, or other time period). The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and broad scope of the appended claims.

Embodiments of the present invention may pertain to any of a variety of types of PHY layers that support an IEEE Std 802.11, including but not limited to, infrared (IR) baseband PHY, frequency hopping spread spectrum (FHSS) radios (e.g., in the 2.4 GHz band), direct sequence spread spectrum (DSSS) radios (e.g., in the 2.4 GHz band), orthogonal frequency domain multiplexing (OFDM) radios (e.g., in the UNII bands), and other types of PHY layers for which an IEEE Std 802.11 is being extended to now and in the future. Further, embodiments of the present invention could be used in conjunction with any IEEE Std 802.11, including IEEE Std 802.11-1997, 802.11a, 802.11b, and other variants of the IEEE Std 802.11 existing or being developed now or in the future.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

The various embodiments could be used in a distributed coordination function (DCF) system, where the physical medium is sensed before transmitting a response frame, or in a point coordination function (PCF) system, where a point coordinator centrally controls access to the physical medium.

What is claimed is:

1. A method comprising:
   detecting when receipt is completed of a physical layer convergence procedure (PLCP) header of a received frame;
   extracting PLCP header information from the PLCP header;
   based on the PLCP header information, predicting response frame PLCP header information before an indication occurs that receipt of the received frame has been completed; and
   sending the response frame with the response frame PLCP header information upon expiration of an interframe space (IFS), which is a period of time after receipt of the received frame is completed during which the response frame should not be transmitted.

2. The method of claim 1, wherein detecting comprises a medium access control (MAC) layer checking an Rx_Frame signal from a physical (PHY) layer, which indicates when the PHY layer has completed receiving the PLCP header.

3. The method of claim 1, wherein extracting the PLCP header information comprises extracting a length of a medium access control (MAC) protocol data unit (MPDU) associated with the received frame, and extracting a rate at which the MPDU was transmitted.

4. The method of claim 1, wherein predicting the response frame PLCP header information comprises predicting a response frame length based on a received length of a medium access control (MAC) protocol data unit (MPDU) associated with the received frame, wherein the received length was extracted from the PLCP header information.

5. The method of claim 1, wherein predicting the response frame PLCP header information comprises predicting a response frame modulation rate based on a received rate of a medium access control (MAC) protocol data unit (MPDU) associated with the received frame, wherein the received rate was extracted from the PLCP header information.

6. The method of claim 1, further comprising:
   calculating an amount of time remaining until an end of the IFS will occur; and
   initializing an IFS timer based on the amount of time remaining.

7. The method of claim 1, wherein sending the response frame comprises beginning to transmit a response frame PLCP preamble when the IFS timer indicates that the IFS has ended.

8. The method of claim 7, further comprising:
   completing preparation of a medium access control (MAC) protocol data unit (MPDU) associated with the response frame while the response frame PLCP preamble is being transmitted.

9. The method of claim 1, wherein the IFS is a time period from a group of time periods including a short IFS (SIFS), a priority IFS (PIFS), a distributed IFS (DIFS), and an extended IFS (EIFS).

10. An apparatus comprising:
    a physical (PHY) device, which receives a received frame and transmits a response frame over a wireless medium; and
    a medium access control (MAC) device, coupled to the PHY device, which
      detects when receipt is completed of a physical layer convergence procedure (PLCP) header of the received frame,
      extracts PLCP header information from the PLCP header,
      based on the PLCP header information, predicts response frame PLCP header information before an indication occurs that receipt of the received frame has been completed, and
      sends the PHY device information, which enables the PHY device to send the response frame with the response frame PLCP header information upon expiration of an interframe space (IFS), which is a period of time after receipt of the received frame is completed during which the response frame should not be transmitted.

11. The apparatus of claim 10, further comprising one or more antennae, coupled to the PHY device, which provide an interface between the wireless medium and the PHY device.

12. The apparatus of claim 10, further comprising an optical transmission device, coupled to the PHY device, which provides an interface between the wireless medium and the PHY device.

13. The apparatus of claim 10, wherein the MAC device detects by checking an Rx_Frame signal from the PHY device, which indicates when the PHY device has completed receiving the PLCP header.

14. The apparatus of claim 10, wherein the MAC device extracts the PLCP header information by extracting a length of a MAC protocol data unit (MPDU) associated with the received frame, and extracting a rate at which the MPDU was transmitted.

15. The apparatus of claim 10, wherein the MAC device predicts the response frame PLCP header information by predicting a response frame length based on a received length of a MAC protocol data unit (MPDU) associated with the received frame, wherein the received length was extracted from the PLCP header. information.

16. The apparatus of claim 10, wherein the MAC device predicts the response frame PLCP header information by predicting a response frame modulation rate based on a received rate of a MAC protocol data unit (MPDU) associated with the received frame, wherein the received rate was extracted from the PLCP header information.

17. The apparatus of claim 10, wherein the MAC device further:
calculates an amount of time remaining until an end of the IFS will occur; and
initializes an IFS timer based on the amount of time remaining.

18. The apparatus of claim 10, wherein the PHY device transmits the response frame by beginning to transmit a response frame PLCP preamble when the IFS timer indicates that the IFS has ended.

19. The apparatus of claim 18, wherein the MAC device further completes preparation of a MAC protocol data unit (MPDU) associated with the response frame while the response frame PLCP preamble is being transmitted.

20. A computer readable medium having program instructions stored thereon to perform a method of interfacing between a medium access control (MAC) layer and a physical (PHY) layer, which when executed within a wireless local area network (WLAN) device, result in:
detecting when receipt is completed of a physical layer convergence procedure (PLCP) header of a received frame;
extracting PLCP header information from the PLCP header;
based on the PLCP header information, predicting response frame PLCP header information before an indication occurs that receipt of the received frame has been completed; and
sending the response frame with the response frame PLCP header information upon expiration of an interframe space (IFS), which is a period of time after receipt of the received frame is completed during which the response frame should not be transmitted.

21. The computer readable medium of claim 20, wherein detecting comprises a medium access control (MAC) layer checking an Rx_Frame signal from a physical (PHY) layer, which indicates when the PHY layer has completed receiving the PLCP header.

22. The computer readable medium of claim 20, wherein extracting the PLCP header information comprises extracting a length of a medium access control (MAC) protocol data unit (MPDU) associated with the received frame, and extracting a rate at which the MPDU was transmitted.

23. The computer readable medium of claim 20, wherein predicting the response frame PLCP header information comprises predicting a response frame length based on a received length of a medium access control (MAC) protocol data unit (MPDU) associated with the received frame, wherein the received length was extracted from the PLCP header information.

24. The computer readable medium of claim 20, wherein predicting the response frame PLCP header information comprises predicting a response frame modulation rate based on a received rate of a medium access control (MAC) protocol data unit (MPDU) associated with the received frame, wherein the received rate was extracted from the PLCP header information.

25. The computer readable medium of claim 20, further comprising:
calculating an amount of time remaining until an end of the IFS will occur; and
initializing an IFS timer based on the amount of time remaining.

26. The computer readable medium of claim 20, wherein sending the response frame comprises beginning to transmit a response frame PLCP preamble when the IFS timer indicates that the IFS has ended.

27. The computer readable medium of claim 26, further comprising:
completing preparation of a medium access control (MAC) protocol data unit (MPDU) associated with the response frame while the response frame PLCP preamble is being transmitted.

* * * * *

UNITED STATES PATENT AND TRADEMARK OFFICE
CERTIFICATE OF CORRECTION

| | |
|---|---|
| PATENT NO. | : 7,263,105 B2 |
| APPLICATION NO. | : 10/322880 |
| DATED | : August 28, 2007 |
| INVENTOR(S) | : Trainin |

It is certified that error appears in the above-identified patent and that said Letters Patent is hereby corrected as shown below:

In column 17, line 4, in Claim 15, after "header" delete ".".

Signed and Sealed this

Twenty-seventh Day of May, 2008

JON W. DUDAS
*Director of the United States Patent and Trademark Office*